United States Patent
Liu et al.

(10) Patent No.: US 9,767,382 B2
(45) Date of Patent: *Sep. 19, 2017

(54) SIMILAR ITEM DETECTION

(71) Applicant: eBay Inc., San Jose, CA (US)

(72) Inventors: Ming Liu, Palo Alto, CA (US); Sumit Borar, San Jose, CA (US); Surya Kallumadi, Manhattan, KS (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,715

(22) Filed: Jul. 6, 2016

(65) Prior Publication Data

US 2016/0314376 A1  Oct. 27, 2016

Related U.S. Application Data

(63) Continuation of application No. 14/586,318, filed on Dec. 30, 2014, now Pat. No. 9,454,713.

(51) Int. Cl.
*G06K 9/68*  (2006.01)
*G06K 9/62*  (2006.01)
(Continued)

(52) U.S. Cl.
CPC ..... *G06K 9/6215* (2013.01); *G06F 17/30256* (2013.01); *G06K 9/4652* (2013.01);
(Continued)

(58) Field of Classification Search
CPC .. G06K 9/6215; G06K 9/6262; G06K 9/4652; G06K 9/52; G06K 9/4661; G06T 7/60; G06T 7/408; G06T 11/60
(Continued)

(56) References Cited

U.S. PATENT DOCUMENTS 6,711,293 B1  3/2004  Lowe
7,577,709 B1  8/2009  Kolcz
(Continued)

FOREIGN PATENT DOCUMENTS

CN  103456022 A  12/2013
WO  2011-095617 A2  3/2012
WO  2013-086255 A1  6/2013

OTHER PUBLICATIONS

International Search Report and Written Opinion from PCT/US2015/060712 dated Jan. 27, 2016, 12 pgs.
(Continued)

*Primary Examiner* — Samir Ahmed
(74) *Attorney, Agent, or Firm* — Maschoff Brennan

(57) ABSTRACT

A method to determine image similarities. The method may include obtaining a first image and a second image and determining a discrete transform difference between a first discrete transform of the first image and a second discrete transform of the second image. The method may also include determining multiple first intensity vectors for the first image and determining multiple second intensity vectors for the second image. The method may also include determining an intensity vector difference between the multiple first intensity vectors and the multiple second intensity vectors and determining a color difference between a first color histogram of the first image and a second color histogram of the second image. The method may also include determining a similarity between the first image and the second image based on the discrete transform difference, the intensity vector difference, and the color difference.

19 Claims, 10 Drawing Sheets

(51) Int. Cl.
  *G06T 11/60* (2006.01)
  *G06K 9/52* (2006.01)
  *G06T 7/60* (2017.01)
  *G06K 9/46* (2006.01)
  *G06Q 30/02* (2012.01)
  *G06Q 30/06* (2012.01)
  *G06F 17/30* (2006.01)

(52) U.S. Cl.
  CPC ............... *G06K 9/52* (2013.01); *G06K 9/62* (2013.01); *G06K 9/6267* (2013.01); *G06Q 30/0276* (2013.01); *G06Q 30/0629* (2013.01); *G06T 7/60* (2013.01); *G06T 11/60* (2013.01)

(58) Field of Classification Search
  USPC .......................................... 382/155, 156, 181
  See application file for complete search history.

(56) References Cited

U.S. PATENT DOCUMENTS

| | | | |
|---|---|---|---|
| 7,830,417 | B2 | 11/2010 | Liu et al. |
| 8,081,824 | B2 | 12/2011 | Li et al. |
| 8,385,971 | B2 | 2/2013 | Rhoads et al. |
| 8,737,737 | B1 | 5/2014 | Feldman et al. |
| 8,798,377 | B2 | 8/2014 | Sanjuan et al. |
| 9,454,713 | B2 * | 9/2016 | Liu ..................... G06K 9/6215 |
| 2005/0084154 | A1 | 4/2005 | Li et al. |
| 2008/0212899 | A1 | 9/2008 | Gokturk et al. |
| 2008/0243837 | A1 | 10/2008 | Davis et al. |
| 2010/0048242 | A1 | 2/2010 | Rhoads et al. |
| 2010/0128141 | A1 | 5/2010 | Jang |
| 2011/0106782 | A1 | 5/2011 | Ke et al. |
| 2011/0142335 | A1 * | 6/2011 | Ghanem ............. G06F 17/3025 382/165 |
| 2011/0238659 | A1 | 9/2011 | Chittar et al. |
| 2011/0286627 | A1 * | 11/2011 | Takacs ................ G06K 9/4642 382/103 |
| 2012/0099784 | A1 | 4/2012 | Marchesotti et al. |
| 2012/0155752 | A1 * | 6/2012 | Zhang ................ G06K 9/4647 382/162 |
| 2013/0083999 | A1 * | 4/2013 | Bhardwaj .......... G06Q 30/0643 382/165 |
| 2014/0169672 | A1 | 6/2014 | Zhu et al. |

OTHER PUBLICATIONS

VLFEAT website, retrieved at http://www.vlfeat.org/api/sift.html, on Dec. 16, 2014.

Distinctive Image Features From Scale-Inavriant Keypoints website, retrieved at http://www.cs.ubc.ca/~lowe/papers/ijcv04.pdf, on Dec. 16, 2014.

Introduction to SIFT (Scale Invariant Feature Transform) website, retrieved at http://docs.opencv.org/master/doc/py_tutorials/py_feature2d/py_sift_intro/py_sift_intro.html, on Dec. 16, 2014.

* cited by examiner

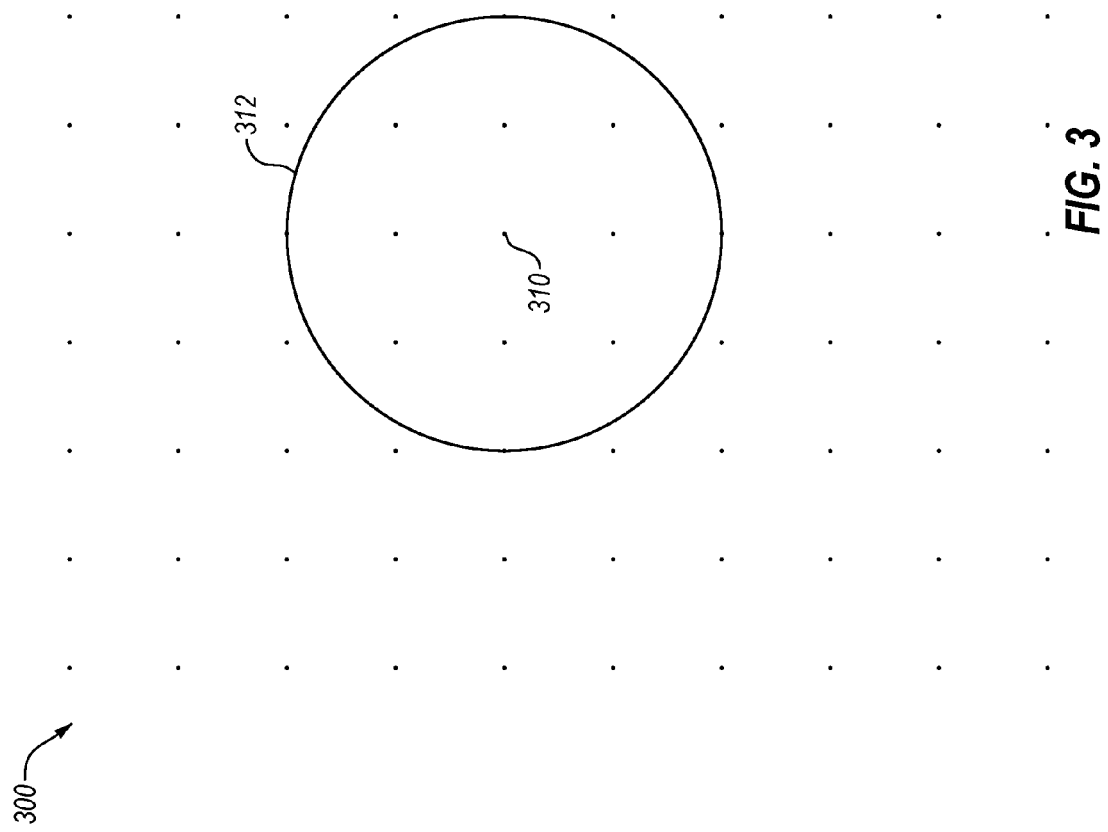

SIMILAR ITEM DETECTION

RELATED APPLICATIONS

This application is a continuation of U.S. patent application Ser. No. 14/586,318, filed on Dec. 30, 2014, titled "SIMILAR ITEM DETECTION", which is incorporated herein by reference.

FIELD

The embodiments discussed herein are related to similar item detection.

BACKGROUND

Many marketplaces allow sellers to post images of merchandise that they are selling. In some circumstances, sellers may generate multiple listings for the same item and use the same image for each listing to try to increase the opportunities for the seller to sell the item. As a result of the multiple listings, buyers in the marketplace searching for merchandise similar to the item may receive search results that include the multiple listings for the same items. Returning multiple listings for the same item may reduce the buying experience of the buyer and/or reduce the incentives for the buyer to buy items from the marketplace.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which:

FIG. 3 illustrates a pixel array;

DESCRIPTION OF EMBODIMENTS

Figure 1:
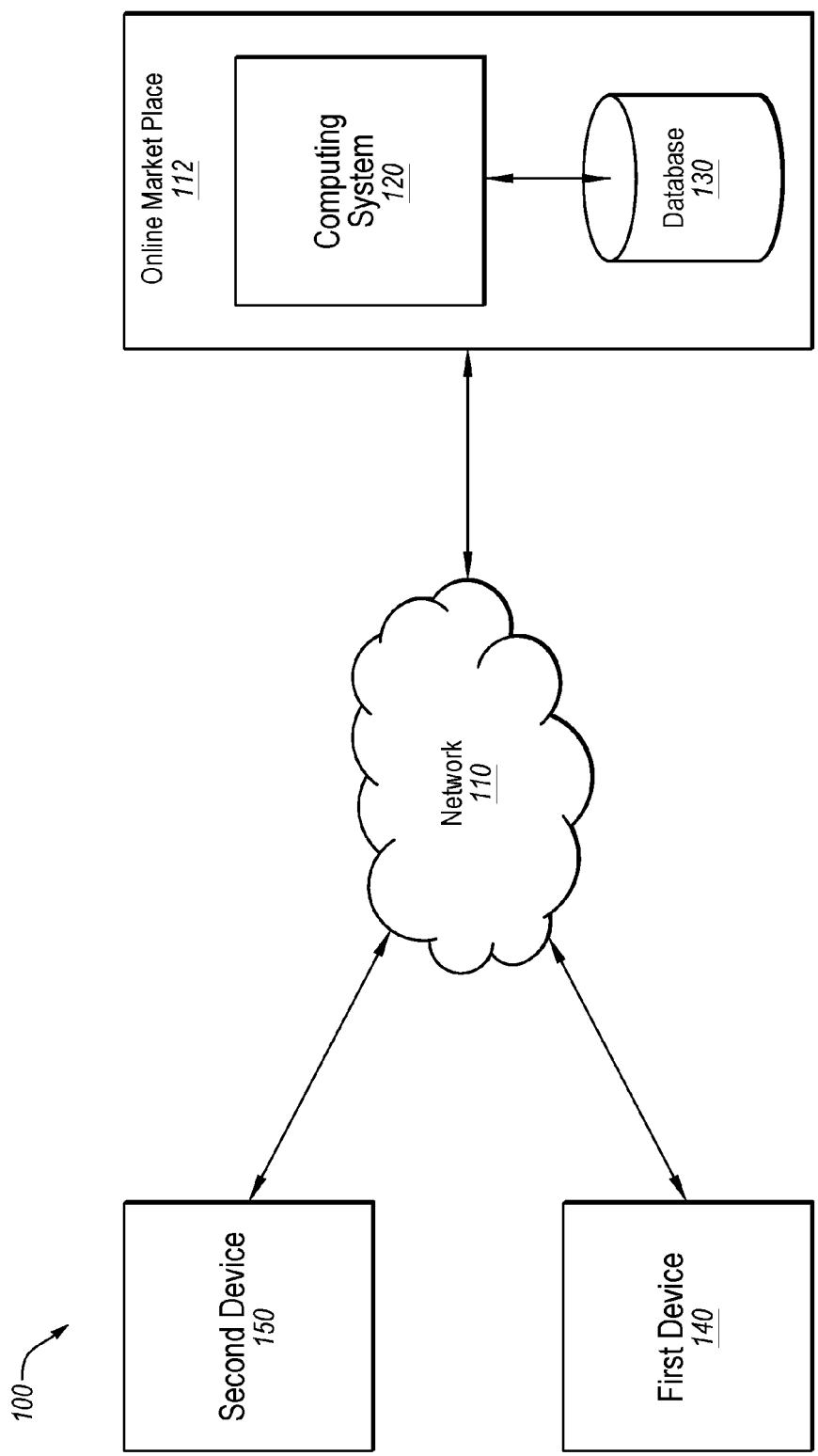
FIG. 1 illustrates an example system to determine image similarities.

In some embodiments in an on-line marketplace, a seller of goods may provide multiple listings of the same goods using duplicate or near duplicate images. In these and other embodiments, the on-line marketplace may identify duplicate or near duplicate images by determining similarities in the images. In these and other embodiments, a system may be described that includes a database and a computing system. The database may be configured to store a first image associated with a first product offered for sale and a second image associated with a second product offered for sale. The computing system may be communicatively coupled to the database.

The computing system may be configured to determine a similarity between the first image and the second image and based on a result of the determination, alter a presentation of the second image to a buyer. In some embodiments, the determining the similarity between the first image and the second image may include various steps. The steps may include determining a discrete transform difference between a first discrete transform of the first image and a second discrete transform of the second image and determining multiple first intensity vectors for the first image. Each of the multiple first intensity vectors may correspond to a different one of multiple first pixels of the first image. The steps may also include determining multiple second intensity vectors for the second image. Each of the multiple second intensity vectors may correspond to a different one of multiple second pixels of the second image. The steps may also include determining an intensity vector difference between the multiple first intensity vectors and the multiple second intensity vectors and determining a color difference between a first color histogram of the first image and a second color histogram of the second image. The steps may also include determining the similarity between the first image and the second image based on the discrete transform difference, the intensity vector difference, and the color difference.

Alternately or additionally, some embodiments herein may describe a method to determine image similarities. The method to determine image similarities may be used by an on-line marketplace or some other system to determine image similarities. The method may include obtaining a first image and a second image and determining a discrete transform difference between a first discrete transform of the first image and a second discrete transform of the second image. The method may also include determining multiple first intensity vectors for the first image. Each of the multiple first intensity vectors may correspond to a different one of multiple first pixels of the first image.

The method may also include determining multiple second intensity vectors for the second image. Each of the multiple second intensity vectors may correspond to a different one of multiple second pixels of the second image. The method may also include determining an intensity vector difference between the multiple first intensity vectors and the multiple second intensity vectors and determining a color difference between a first color histogram of the first image and a second color histogram of the second image. The method may also include determining a similarity between the first image and the second image based on the discrete transform difference, the intensity vector difference, and the color difference.

Alternately or additionally, some embodiments herein may describe another method to determine image similarities. The method to determine image similarities may be used by an on-line marketplace or some other system to determine image similarities. The method may include obtaining a first image and a second image and determining multiple first value intensity vectors for the first image. Each of the multiple first value intensity vectors may correspond to a different one of multiple first value pixels of the first image. The method may also include determining multiple second value intensity vectors for the second image. Each of the multiple second value intensity vectors may correspond to a different one of multiple second value pixels of the second image.

The method may also include determining a value intensity vector difference between the multiple first value intensity vectors and the multiple second value intensity vectors and determining multiple first set intensity vectors for the first image. Each of the multiple first set intensity vectors may correspond to a different one of multiple first set pixels of the first image. The method may also include determining multiple second set intensity vectors for the second image. Each of the multiple second set intensity vectors may correspond to a different one of multiple second set pixels of the second image. The method may also include determining a set intensity vector difference between the multiple first set intensity vectors and the multiple second set intensity vectors and determining multiple first random intensity vectors for the first image. Each of the multiple first random intensity vectors may correspond to a different one of multiple first random pixels of the first image.

The method may also include determining multiple second random intensity vectors for the second image. Each multiple of second random intensity vectors may correspond to a different one of multiple second random pixels of the second image. The method may also include determining a random intensity vector difference between the multiple first random intensity vectors and the multiple second random intensity vectors and determining a similarity between the first image and the second image based on the value intensity vector difference, the set intensity vector difference, and the random intensity vector difference.

Turning to the figures, FIG. 1 illustrates an example system 100 to determine image similarities. The system 100 may be arranged in accordance with at least one embodiment described herein. The system 100 may include a network 110, an on-line marketplace 112 that includes a computing system 120 and a database 130, a first device 140, and a second device 150.

The network 110 may be configured to communicatively couple the on-line marketplace 112 with the first device 140 and the second device 150. In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some implementations, the network 110 may include a peer-to-peer network. The network 110 may also be coupled to or may include portions of a telecommunications network for sending data in a variety of different communication protocols. In some implementations, the network 110 includes Bluetooth® communication networks or a cellular communications network for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

The on-line marketplace 112 may be any configuration of hardware, such as servers and databases, that are configured to provide an on-line marketplace for sellers to sell goods to buyers. For example, the on-line marketplace 112 may be configured to provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. The prices set for a transaction may be auction-format listing and price setting mechanisms (e.g., English, Dutch, Chinese, Double, Reverse auctions, etc.). Other types of price listing formats may also be used. For example, a fixed-price listing format (e.g., the traditional classified advertisement-type listing or a catalogue listing) or a buyout-type listing format may be used. In these and other embodiments, a buyout-type listing may be offered in conjunction with auction-format listings and allow a buyer to purchase goods or services, which are also being offered for sale via an auction, for a fixed price that is typically higher than a starting price of an auction for an item.

As part of the listing of goods for sale, a seller may provide an image of an item. The image of the item may provide a visual representation of the item to be sold. In some embodiments, a seller may create multiple listings for the same item using the same or near duplicate images of the item. In some circumstances, a seller creating multiple listings for the same item may be undesirable for buyers because multiple duplicate items of a type of goods may be presented to the buyer when the buyer searches for the types of goods.

In some embodiments, the on-line marketplace 112 may be configured to determine when the same or near duplicate images of an item are posted in two different listings based on a similarity between the images of the items. In these and other embodiments, in response to the on-line marketplace 112 determining that the images of the item are similar, the on-line marketplace 112 may take action with respect to listings with the same or near duplicate images of the item. In some embodiments, the action taken by the on-line marketplace 112 may include removing a listing with the similar image or reducing the placement of the listing with the similar image in search results provided to a buyer.

Images of items in listings may be determined to be similar images when the images are duplicate images. For example, a first listing may include a first image and a second listing may include a second image. When the first and second images are duplicate images, the second image may be a digital copy of the first image. For example, a seller may upload the same image to the on-line marketplace 112 for both the first and second listings.

Alternately or additionally, images in a listing may be determined to be similar images when one of the images is a modified version of another of the images. For example, a first listing may include a first image and a second listing may include a second image that is a modified version of the first image. To create the second image as a modified version of the first image, a digital copy of the first image may be created and manipulated through digital processing to generate the second image. For example, the digital copy of the first image may be digitally manipulated by adding a watermark to the digital copy. Alternately or additionally, the digital copy may be digitally manipulated by adjusting a color or luminance of one or more pixels of the digital copy. In some embodiments, the digital processing manipulation may result in a difference between the first and second images that may not be perceived by a human eye, but that may be detected by a strict comparison of the first and second images, such as a hash value comparison of the first and second images.

In some embodiments, the computing system 120 of the on-line marketplace 112 may be configured to determine a similarity between the first and second images of different listings. In these and other embodiments, the first and second images of the different listings may be stored in the database 130.

In some embodiments, the computing system 120 may be a single computing system that includes one or more processors and memory, such as a server or some other computing system. Alternately or additionally, the computing system 120 may include multiple computing systems, such as multiple servers, that are networked together and configured to perform a task. The database 130 may be any configuration of digital data storage.

To determine the similarity between the first and second images, the computing system 120 may obtain the images from the database 130 and obtain different features of the first and second images. For example, the computing system 120 may be configured to determine at least one of macro features, micro features, and color features of the first and second images. The computing system 120 may determine the similarity between the first and second images based on these features.

By using at least one of the macro features, the micro features, and the color features, the computing system 120 may distinguish similar images, including images that are duplicate images and images that are duplicate images with digital manipulations. For example, using the macro features to consider a whole of a first and a second image, the computing system 120 may determine if the first and second images are duplicate images. In some embodiments, the macro features of the first and second images, if the second image is a digitally manipulated duplicate of the first image, may indicate that the images are similar because the macro features may be unaffected by some digital manipulations, such as water marks. However, in some embodiments, the macro features may not properly distinguish between the first and second images with minor differences and thus misclassify the first and second images as similar when the first and second images are not similar (e.g., when the first and second images are not duplicates or duplicates with a digital manipulation that would not be visible to a human).

The micro features of the first and second images may consider small portions of the first and second images and may properly distinguish between the first and second images with minor differences. The minor differences, such as a digital manipulation of a duplicate image, between the first and second images when using the micro features may result in the first and second images being determined to not be similar. By combining information from both the micro features and the macro features, a better determination of the similarity of the first and second images may be obtained.

In some embodiments, the macro and micro features may not consider the colors of the first and second features. For example, the macro and micro features may use a grayscale of the first and second images. In these and other embodiments, the color features may also provide information about the similarity between the first and second images. A small difference in the color features may indicate that the first and second images are similar. In some embodiments, a large difference in the color features along with a small difference in the macro and micro features may indicate that the first and second images are of a same item but that are different colors. Thus, the first and second images may not be similar.

For example, assume that a seller lists a camera for sale in first and second listings using first and second images of the camera. The second image of the camera may be a duplicate image of the first image with a small water mark that is not perceived in the image by viewers of the listing. The macro features of the first and second images may indicate that the first and second images are the same. The micro features of the first and second images may indicate that multiple of the micro features are very similar, but have minor differences. The color features may indicate that the first and second images are similar. As a result, the computing system 120 may determine that the first and second images are similar.

As another example, assume that a seller lists a first camera for sale in a first listing and a second camera for sale in a second listing using first and second images of the first and second cameras, respectively. The first and second cameras may be cameras of the same model, but the first and second images may be slightly different because the first and second images may be taken at slightly different angles. The macro features of the first and second images may indicate that the first and second images are not the same. The micro features of the first and second images may indicate that micro features are similar but mostly not the same. The color features may indicate that the first and second images are very similar. As a result, the computing system 120 may determine that the first and second images are not similar.

As another example, assume that a seller lists a first camera for sale in a first listing and a second camera for sale in a second listing using first and second images of the first and second cameras, respectively. The first and second cameras may be cameras of the same model but different colors. The grayscale macro features of the first and second images may indicate that the first and second images are the same. The grayscale micro features of the first and second images may indicate that the micro features are the same. The color features may indicate that the first and second images are not similar. As a result, the computing system 120 may determine that the first and second images are not similar.

In some embodiments, the computing system 120 may determine a difference between the macro features, the micro features, and the color features of the first and second images and provide the differences to a similarity model. The similarity model may generate an indication of whether the first and second images are similar based on the differences. In some embodiments, the similarity model may be generated using machine learning. As a result, the similarity model may be generated based on training images that reflect a level of similarity suited to an operator of the on-line marketplace 112.

In some embodiments, the computing system 120 may determine the macro features of the first and second images based on a discrete transform of the first and second images. For example, the discrete transform may be a discrete cosine transform, a discrete sine transform, or a modified discrete cosine transform.

In these and other embodiments, the computing system 120 may determine a first discrete transform for the first image and a second discrete transform of the second image. The computing system 120 may determine a discrete transform difference between the first discrete transform and the second discrete transform. In some embodiments, the discrete transform difference may represent a macro-level feature difference between the first and second images. The discrete transform difference may be provided to the similarity model and used by the similarity model to determine a similarity between the first and second images.

In some embodiments, the computing system 120 may determine the micro features of the first and second images using multiple intensity vectors derived for each of the first and second images. In these and other embodiments, the computing system 120 may determine multiple first intensity vectors for the first image and multiple second intensity vectors for the second image. Each of the multiple first intensity vectors may correspond to a different pixel in the first image. Each of the multiple second intensity vectors may correspond to a different pixel in the second image.

In some embodiments, the computing system 120 may determine one, two, or three different types of multiple intensity vectors for each of the first and second images. One type of the multiple intensity vectors may be value-pixel intensity vectors. Another type of the multiple intensity vectors may be set-pixel intensity vectors. Another type of the multiple intensity vectors may by random-pixel intensity vectors. For each type of intensity vectors selected, the computing system 120 may determine multiple intensity vectors. Each of the multiple intensity vectors for each type of intensity vector may correspond with a different pixel in the first and second images.

A pixel, with which a single intensity vector corresponds, may be a center pixel used when determining the intensity vector. The intensity vector may be generated based on an intensity level and orientation of multiple pixels surrounding the center pixel. The intensity level of a pixel may include a pixel value associated with a pixel that indicates a brightness of the pixel. An intensity orientation of a pixel may include an orientation of an intensity gradient calculated based on one of more pixels surrounding the pixel.

In general, the size of an intensity vector may be based on a level of granularity for grouping the intensity orientations of the pixels. In some embodiments, a size of the intensity vector may vary for each intensity vector type. Alternately or additionally, a number of pixels surrounding the center pixel that are used to calculate the intensity vector may also vary for the different types of intensity vectors.

In some embodiments, the pixels to which value-pixel intensity vectors correspond may be pixels with illumination intensity maximums. In some embodiments, the pixels with illumination intensity maximums may be pixels at edges within an image. In some embodiments, the pixels to which random-pixel intensity vectors correspond may be pixels selected randomly from an image with at least a minimum pixel distance there between. In some embodiments, the pixels to which set-pixel intensity vectors correspond may be pixels from a particular grid of pixels. In these and other embodiments, the particular grid of pixels may be pixels that are equal spaced in a grid throughout an image.

In some embodiments, the computing system 120 may determine multiple first random-pixel intensity vectors for the first image and multiple second random-pixel intensity vectors for the second image. The computing system 120 may compare the first random-pixel intensity vectors and the second random-pixel intensity vectors to determine a random pixel intensity difference. In some embodiments, the random pixel intensity difference may represent a micro-level feature difference between the first and second images. The random pixel intensity difference may be provided to the similarity model and used by the similarity model to determine a similarity between the first and second images.

Alternately or additionally, the computing system 120 may determine multiple first set-pixel intensity vectors for the first image and multiple second set-pixel intensity vectors for the second image. The computing system 120 may compare the first set-pixel intensity vectors and the second set-pixel intensity vectors to determine a set-pixel intensity difference. In some embodiments, the set-pixel intensity difference may represent a micro-level feature difference between the first and second images. The set-pixel intensity difference may be provided to the similarity model and used by the similarity model to determine a similarity between the first and second images.

Alternately or additionally, the computing system 120 may determine multiple first value-pixel intensity vectors for the first image and multiple second value-pixel intensity vectors for the second image. The computing system 120 may compare the first value-pixel intensity vectors and the second value-pixel intensity vectors to determine a value-pixel intensity difference. In some embodiments, the value-pixel intensity difference may represent a micro-level feature difference between the first and second images. The value-pixel intensity difference may be provided to the similarity model and used by the similarity model to determine a similarity between the first and second images.

In some embodiments, the computing system 120 may determine the color features of the first and second images based on the saturation and hue characteristics of the first and second images. Using the saturation and hue characteristics of the first and second images, the computing system 120 may generate a first color histogram for the first image and a second color histogram for the second image. The computing system 120 may also determine a color difference between the first color histogram and the second color histogram. In some embodiments, the color difference may represent a color level feature difference between the first and second images. The color difference may be provided to the similarity model and used by the similarity model to determine a similarity between the first and second images.

The computing system 120 may be configured to determine similarities between images at any event that occurs with respect to the images in the on-line marketplace 112. For example, in some embodiments, when an image is uploaded to the database 130, the computing system 120 may access other images in the database and determine similarities between the recently uploaded image and other images in the database. Alternately or additionally, the computing system 120 may determine similarities between images based on a particular schedule, such as daily, weekly, etc., a random schedule, or a number of images uploaded, among other events.

In response to determining that images are similar, the computing system 120 may remove one of the images, send a request to a seller who uploaded one of the images to remove the one of the images, or tag one of the images such that the images do not appear together in search results, among other actions.

In some embodiments, the computing system 120 may determine similarities between a recently received image and all other images in the database 130 or some particular set of the images in the database 130, such as images in a similar classification of goods. For example, the computing system 120 may compare a recently received image from a specific seller to other images uploaded by the specific seller. Alternately or additionally, the computing system 120 may compare a recently received image from a specific seller to other images uploaded by one or more sellers associated with the specific seller.

Alternately or additionally, the computing system 120 may determine similarities between images returned from a search for a good performed by a buyer. For example, a buyer may submit a search for particular goods. The on-line marketplace 112 may conduct a search for the particular goods and select listings for displaying to the buyer. After compiling the listings for displaying to the buyer, but before sending the listings to the buyer over the network 110, the computing system 120 may determine the similarities between images on the selected listings. In response to determining a similarity difference between images of two of the listings, the computing system 120 and/or the on-line marketplace 112 may remove one of the listings with the similar images from the listings to display to the buyer. Alternately or additionally, in response to determining a similarity difference between images of two of the listings, the computing system 120 and/or the on-line marketplace 112 may adjust the position of one of the listings with the similar images in the listings to display to the buyer. For example, the position of the one of the listings with the similar images may be demoted by causing the one of the listings to be placed on a second or subsequent page.

An example of the operation of the system 100 follows. A seller in the on-line marketplace 112 may interact with the on-line marketplace 112 using the first device 140. For example, the seller may interact with the on-line marketplace 112 using an internet browser operating on the first device 140. The seller may create a first listing for selling a camera and upload a first image of the camera to the on-line marketplace 112 through the network 110. The on-line marketplace 112 may store the first image in the database 130.

The seller may also create a second listing for selling the camera and upload a second image of the camera to the on-line marketplace 112. The second image may be similar to the first image, in that the second image may be a digital copy of the first image or a digital copy of the first image with processing manipulations.

In some embodiments, upon receipt of the second image, the computing system 120 may determine a similarity between the second image and other images uploaded by the seller, including the first image. In response to determining that the first image and the second image are similar, the computing system 120 may remove the second listing from the on-line marketplace 112.

Alternately or additionally, a buyer through the second device 150 may access the on-line marketplace 112. The buyer may perform a search for cameras generally. The on-line marketplace 112 may search the listings for cameras and prepare search results that include the first and second listings. After preparing the search results, but before sending the search results to the second device 150, the computing system 120 may determine similarities between images of the listings in the search results. After determining that the first and second images are similar, the computing system 120 or the on-line marketplace 112 may remove the second listing from the search results or demote the second listing to a later page in the search result. The on-line marketplace 112 may then send the search results to the second device 150 for display to the buyer.

In some on-line marketplaces, the marketplaces may compare images of different listings to determine if the images are duplicate images and remove listings with duplicate images. To avoid having listings removed, a seller may be able to generate multiple listings using a single image that is digitally manipulated in multiple ways. In contrast, the on-line marketplace 112 using the computing system 120 may determine images that are similar and remove listings with images that are duplicate images or duplicate images with digital manipulations. As a result, the on-line marketplace 112 may include less redundant listings and a better buyer experience.

Generally, other marketplaces, such as print media, may not have a redundant listings problem as sellers may pay for every listing of an item. In contrast, on-line marketplaces may charge a fee to a seller when an item is sold and not when an item is listed. As a result, a seller may be motivated to include multiple listings. An on-line marketplace, however, may desire less redundant listings for a better buyer experience. As noted, typical methods of detecting duplicate images may not detect similar images when a seller digitally manipulates a duplicate image. As a result, sellers in some on-line marketplaces may be able to include duplicate listings. The current disclosure provides an on-line marketplace with the ability to detect similar images. Furthermore, in circumstances, the digital manipulations to duplicate images may not be visual to a human. As a result, a human reviewing the images may not be able to detect the similar images and reduce redundant listings. The present disclosure, in some embodiments, describes a computing system that may detect similar images and reduce redundant listings to improve a user experience that may not be able to be performed by a human.

In view of this disclosure, it will be appreciated that modifications, additions, or omissions may be made to the system 100 without departing from the scope of the present disclosure. For example, in some embodiments, the system 100 may not include the first and second devices 140 and 150. Alternately or additionally, the on-line marketplace 112 may include additional components and/or networks than those illustrated in FIG. 1.

Figure 2A:
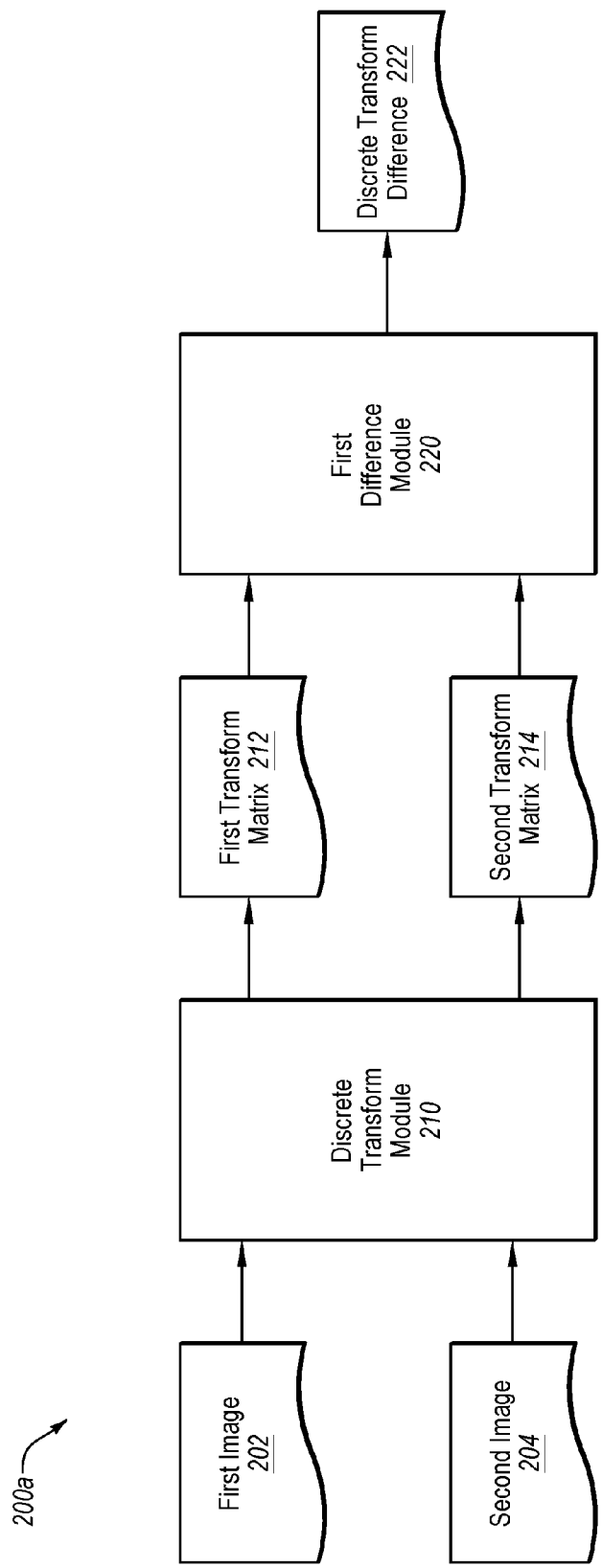
FIG. 2A illustrates a portion of an image similarity determination process.

FIG. 2A illustrates a portion of an image similarity determination process 200A. The process 200A may be arranged in accordance with at least one embodiment described herein. The process 200A may be performed using a discrete transform module 210 ("the DT module 210") and a first difference module 220.

The process 200A may include determining a discrete transform difference 222 between a first image 202 and a second image 204. To begin the process 200A, the DT module 210 may receive the first image 202 and the second image 204. The DT module 210 may be configured to apply a discrete transform to the first image 202 to generate a first transform matrix 212. The DT module 210 may also be configured to apply a discrete transform to the second image 204 to generate a second transform matrix 214. The first transform matrix 212 and the second transform matrix 214 may be frequency representations of the first and second images 202 and 204. In some embodiments, the discrete transform applied by the DT module 210 may be a discrete cosine transform, a discrete sine transform, or a modified discrete cosine transform.

In some embodiments, the DT module 210 may process the first and second images 202 and 204 before applying the discrete transform to the first and second images 202 and 204. For example, in some embodiments, the DT module 210 may down sample the first and second images 202 and 204 to reduce a number of pixels of the first and second images 202 and 204. For example, the DT module 210 may generate down sampled first and second images 202 and 204 that are 16×16, 20×20, 24×24, 32×32, or some other number of pixels. The DT module 210 may also be configured to convert the first and second images 202 and 204 to grayscale images before applying the discrete transform.

The first and second transform matrices 212 and 214 may be provided to the first difference module 220. The first difference module 220 may be configured to determine a difference between the first and second transform matrices 212 and 214 and to output the difference as the discrete transform difference 222. In some embodiments, the difference may be calculated based on a portion of the first and second transform matrices 212 and 214. In some embodiments, the first difference module 220 may compare the low frequency components of the first and second transform matrices 212 and 214. In these and other embodiments, the first difference module 220 may compare the low frequency components by comparing a sub-matrix of the first and second transform matrices 212 and 214 that includes the origin of the first and second transform matrices 212 and 214.

In some embodiments, the first difference module 220 may encode the first and second transform matrices 212 and 214 into binary matrices and compare the binary matrices to determine the discrete transform difference. In these and other embodiments, to generate a binary matrix of the first transform matrix 212, the first difference module 220 may calculate a mean of the values of the first transform matrix 212 and encode the values above the mean as a 1 and encode the value below or equal to the mean as zero. The first difference module 220 may generate the binary matrix of the second transform matrix 214 in a similar manner. In these and other embodiments, the first difference module 220 may determine the discrete transform difference 222 by determining a hamming distance difference between the binary matrices.

In view of this disclosure, it will be appreciated that modifications, additions, or omissions may be made to the process 200A without departing from the scope of the present disclosure.

Figure 2B:
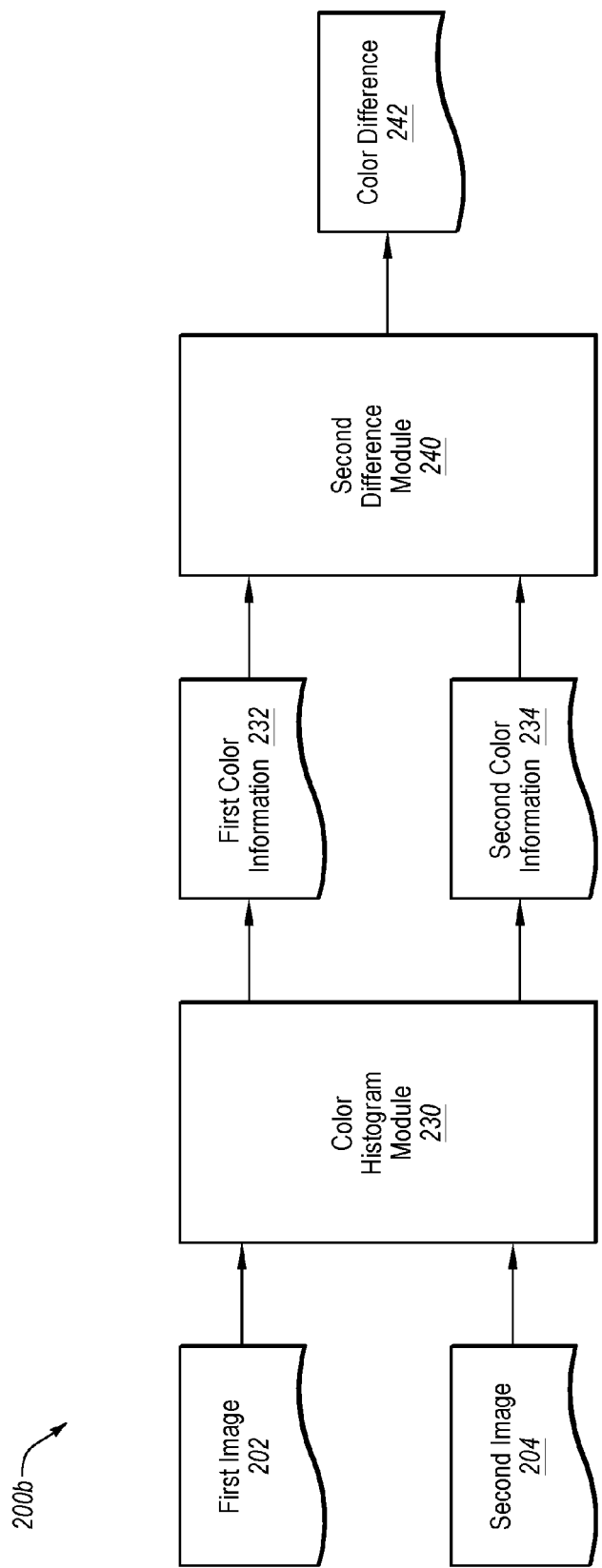
FIG. 2B illustrates a portion of an image similarity determination process.

FIG. 2B illustrates a portion of an image similarity determination process 200B. The process 200B may be arranged in accordance with at least one embodiment described herein. The process 200B may be performed using a color histogram module 230 and a second difference module 240.

The process 200B may include determining a color difference 242 between the first image 202 and the second image 204. The first image 202 and the second image 204 may be the same images used in the process 200A described with respect to FIG. 2A.

To begin the process 200B, the color histogram module 230 may receive the first image 202 and the second image 204. The color histogram module 230 may be configured to convert the first image 202 and the second image 204 to a hue, saturation, value (HSV) standard. The color histogram module 230 may extract the first hue and saturation image planes of the first image 202. Using the first hue image plane, the color histogram module 230 may form a first hue histogram as represented by a vector. The first hue histogram may include multiple bins that cover the spectrum of possible hue values. A magnitude of the hue values from the hue image plane may be combined in their appropriate bin in the first hue histogram to form the first hue histogram. Using the first saturation image plane, the color histogram module 230 may form a first saturation histogram from the first saturation plane. The combined first hue and saturation histograms may form first color information 232 and may be provided to the second difference module 240.

The color histogram module 230 may extract second hue and saturation image planes of the second image 204. Using the second hue image plane, the color histogram module 230 may form a second hue histogram. Using the second saturation image plane, the color histogram module 230 may form a second saturation histogram. The combined second hue and saturation histograms may form second color information 234 and may be provided to the second difference module 240.

The second difference module 240 may be configured to determine a difference between the first color information 232 and the second color information 234. In some embodiments, to determine the difference between the first color information 232 and the second color information 234, the second difference module 240 may compare the first hue histogram with the second hue histogram. In some embodiments, to compare the first hue histogram with the second hue histogram the second difference module 240 may determine a hue Euclidean distance between vectors that represent the first hue histogram and the second hue histogram.

In some embodiments, to determine the difference between the first color information 232 and the second color information 234, the second difference module 240 may compare the first saturation histogram with the second saturation histogram. In some embodiments, to compare the first saturation histogram with the second saturation histogram the second difference module 240 may determine a saturation Euclidean distance between vectors that represent the first saturation histogram and the second saturation histogram.

The second difference module may determine the color difference 242 based on a saturation Euclidean distance, the hue Euclidean distance, or some combination of the saturation Euclidean distance and the hue Euclidean distance. For example, the color difference 242 may be a mean of the saturation Euclidean distance and the hue Euclidean distance.

In view of this disclosure, it will be appreciated that modifications, additions, or omissions may be made to the process 200B without departing from the scope of the present disclosure.

Figure 2C:
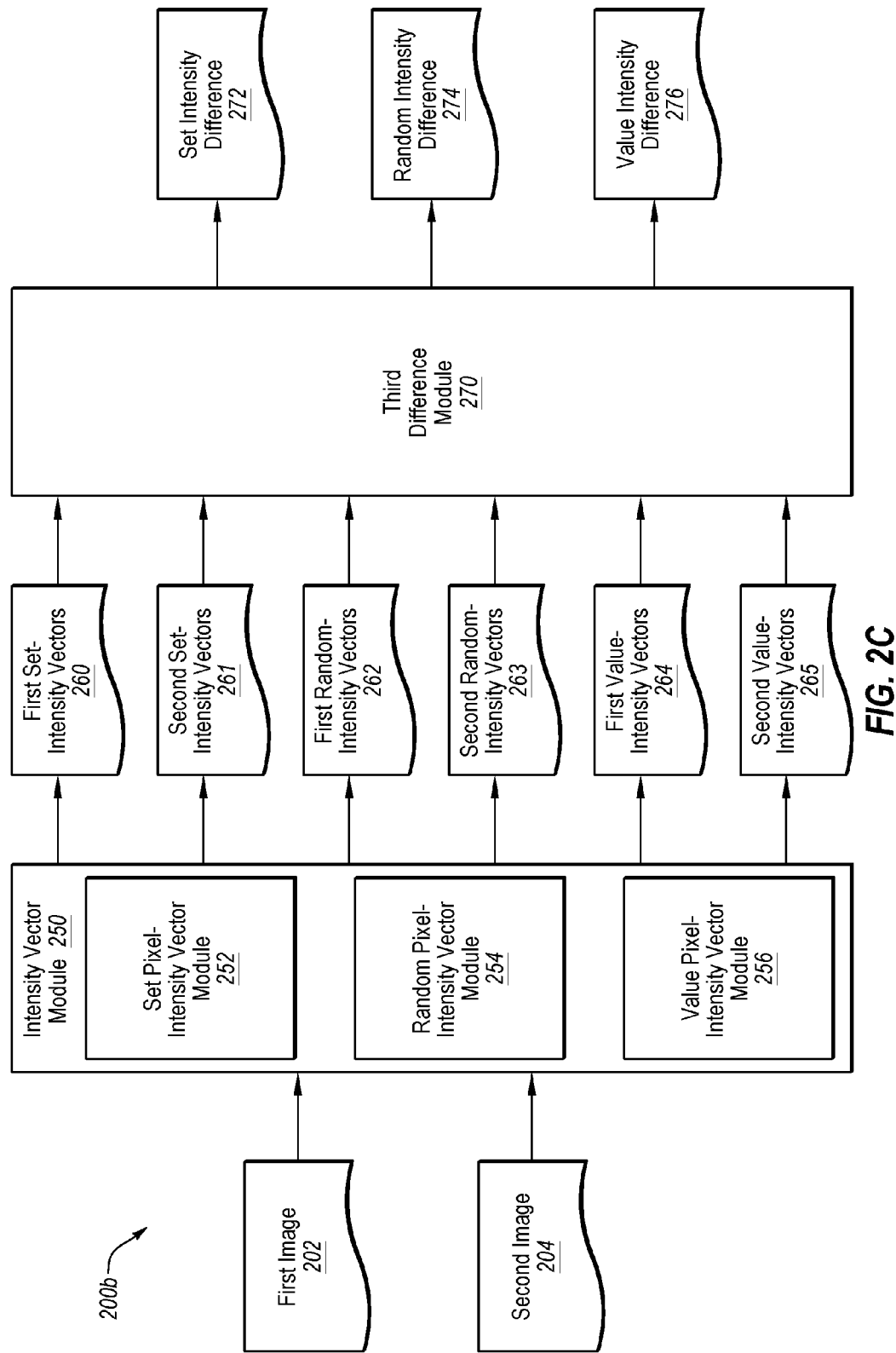
FIG. 2C illustrates a portion of an image similarity determination process.

FIG. 2C illustrates a portion of an image similarity determination process 200C. The process 200C may be arranged in accordance with at least one embodiment described herein. The process 200C may be performed using an intensity vector module 250 and a third difference module 270. The intensity vector module 250 may include a set pixel-intensity vector module 252 ("the set module 252"), a random pixel-intensity vector module 254 ("the random module 254"), and value pixel-intensity vector module 256 ("the value module 256").

The process 200C may include determining multiple set pixel-intensity vectors, multiple random pixel-intensity vectors, and multiple value pixel-intensity vectors for each of the first and second images 202 and 204. The first image 202 and the second image 204 may be the same images used in the process 200A and process 200B described with respect to FIGS. 2A and 2B, respectively.

To begin the process 200C, the intensity vector module 250 may receive the first image 202 and the second image 204. The intensity vector module 250 may be configured to determine an intensity gradient for each of the pixels of the first and second images 202 and 204.

In some embodiments, the intensity vector module 250 may determine the intensity gradients of each of the pixels using a scale invariant feature transform (SIFT). An example of determining the intensity gradient for pixels using SIFT follows.

In some embodiments, the intensity vector module 250 may determine the intensity gradients for each of the pixels of first and second images 202 and 204 by comparing the intensity for a selected pixel with the intensities of one or more pixels surrounding the selected pixels. For example, to determine the intensity gradient for a first pixel, the intensity vector module 250 may compare the intensity of the first pixel with an intensity of a second pixel above the first pixel and of a third pixel to the right of the first pixel. In these and other embodiments, the intensity vector module 250 may determine the intensity gradient of the first pixel by taking the root of the sum of the squares of the intensities differences between the first pixel and the second and third pixels. The intensity vector module 250 may also be configured to determine an angle, e.g., orientation, of the intensity gradient. The orientation of the intensity gradient of a pixel may be found based on the following equation:

$$\text{Orientation} = \tan^{-1}\left(\frac{A_1 - A_2}{A_1 - A_3}\right)$$

where $A_1$ is the intensity of the first pixel, $A_2$ is the intensity of the second pixel, and $A_3$ is the intensity of the third pixel. In some embodiments, other pixels surrounding the first pixel may be used to determine the intensity gradient of the first pixel.

The intensity vector module 250 may provide the intensity gradients of the pixels of the first and second images 202 and 204 to each of the set module 252, the random module 254, and the value module 256.

The set module 252 may determine multiple set intensity vectors for each of the first and second images 202 and 204 using the intensity gradients of some of the pixels in the first and second images 202 and 204. Each of the multiple set intensity vectors in the first image 202 may correspond and be calculated based on a particular pixel in the first image 202. Each of the multiple set intensity vectors in the second image 204 may correspond and be calculated based on a particular pixel in the second image 204.

To determine the multiple set intensity vectors for each of the first and second images 202 and 204, the set module 252 may determine multiple set pixels for each of the first and second images 202 and 204. The set pixels for each of the first and second images 202 and 204 may be corresponding pixels in the first and second images 202 and 204. The set pixels may be selected based on a particular equally spaced grid applied to the first and second images 202 and 204. For example, the grid may be a square grid that includes four points that are equally spaced apart. The four points may correspond to pixels in the first and second images 202 and 204. The pixels to which the four points may correspond may be referred to herein as the set pixels. The set pixels of the first image 202 may be the first set pixels and the set pixels of the second image 204 may be the second set pixels. In other embodiments, the grid may include 6, 8, 9, 12, 15, 20, or some other number of points. In these and other embodiments, the grid may be square or some other shape.

For example, FIG. 3 illustrates a pixel array 300. The pixel array 300 includes 100 pixels arranged in a 10×10 grid. In an example, the grid for selecting the set pixels may be a four point 6×6 square grid. As a result, the set pixels may be pixels (2,2), (8,2), (2,8), and (8,8). As another example, the grid for selecting the set pixels may be a nine point 6×6 square grid. As a result, the set pixels may be pixels (2,2), (2,5), (2,8), (5,2), (5,5), (5,8), (8,2), (8,5), and (8,8).

Returning to FIG. 2C, the set module 252 may determine a set intensity vector for each of the set pixels. The set intensity vector may be calculated using the intensity gradients and orientations of the pixels surrounding the set pixels within a region surrounding the set pixels. The size of the region surrounding each of the set pixels may vary or may be constant. In some embodiments, the region may be a circular region surrounding the set pixels or some other shape. In some embodiments, the regions for the set intensity vectors may be based on the grid used to select the set pixels. In these and other embodiments, the grids and thus the regions may cover a majority of the first image and second images 202 and 204. In some embodiments, the grids and thus the regions may cover over 80% of the first and second images 202 and 204.

In some embodiments, the set pixels may be selected as keypoints in a SIFT. The set intensity vectors may be a keypoint descriptor vector from the SIFT. A brief description of one example of how a keypoint descriptor is determined follows.

FIG. 3 illustrates a pixel array 300 with a set pixel 310 and a set region 312. The pixels inside the set region 312 may be referred to herein as region pixels. The set module 252 may apply a Gaussian function to the intensity gradient magnitudes of each of the region pixels, with the set pixel 310 being a center of the Gaussian function. The orientations of each of the intensity gradients of the region pixels may be adjusted based on the orientation of the set pixel 310. A number of orientation groupings may be selected to cover the 360 degrees of the orientations of the intensity gradients. For example, with 4 groupings, each of the groups may cover 90 degrees. The region pixels are grouped together according to the orientation groupings. For example, a region pixel with an aligned orientation of 45 degrees may be in the 0 to 90 degree group and a region pixel with an aligned orientation of 150 degrees may be in the 90 to 180 degree group. The Gaussian adjusted intensity gradient magnitudes of each of the region pixels in each of the orientation groupings may be summed. A vector representing the orientation groupings and the summed Gaussian adjusted intensity gradient magnitudes may be a set intensity vector for the set pixel 310.

Returning to FIG. 2C, the set module 252 may determine multiple first set intensity vectors 260 for the set pixels of the first image 202 and provide the first set intensity vectors 260 to the third difference module 270. The set module 252 may also determine multiple second set intensity vectors 261 for the set pixels of the second image 204 and provide the second set intensity vectors 261 to the third difference module 270.

The random module 254 may determine multiple random intensity vectors for each of the first and second images 202 and 204 using the intensity gradients of each of the pixels. Each of the multiple random intensity vectors in the first image 202 may correspond to and be calculated based on a particular random pixel in the first image 202. Each of the multiple random intensity vectors in the second image 204 may correspond to and be calculated based on a particular random pixel in the second image 204.

To determine the multiple random intensity vectors for each of the first and second images 202 and 204, the random module 254 may determine multiple random pixels for each of the first and second images 202 and 204. The random pixels for each of the first and second images 202 and 204 may be corresponding pixels in the first and second images 202 and 204. The random pixels may be selected randomly from the pixels in the first and second images 202 and 204. In some embodiments, the random pixels may be selected randomly with a particular distance between the random pixels. In some embodiments, the random pixels may be selected from a central region of the first and second images 202 and 204. A number of random pixels selected may vary based on a number of pixels in the image. In some embodiments, for a 300×300 pixel image, a number of random pixels may include 5, 10, 15, 20, 25, 30, 50, 75, or 100 random pixels. A random region size (e.g., a number of pixels included in the random region) for determining the random intensity vectors may be based on a number of selected random pixels and a number of pixels in the image. In some embodiments, the random region size may be smaller than the set region size.

Based on the random region size and the random pixels, the random module 254 may determine multiple first random intensity vectors 262 for the first image 202 and provide the first random intensity vectors 262 to the third difference module 270. The random module 254 may also determine multiple second random intensity vectors 263 for the second image 204 and provide the second random intensity vectors 263 to the third difference module 270. In these and other embodiments, the random module 254 may determine the first random intensity vectors 262 and the second random intensity vectors 263 in a manner analogous to the operation of the set module 252 as discussed above.

The value module 256 may determine multiple value intensity vectors for each of the first and second images 202 and 204 using the intensity gradients of each of the pixels. Each of the multiple value intensity vectors in the first image 202 may correspond and be calculated based on a particular value pixel in the first image 202. Each of the multiple value intensity vectors in the second image 204 may correspond and be calculated based on a particular value pixel in the second image 204.

To determine the multiple value intensity vectors for each of the first and second images 202 and 204, the value module 256 may determine multiple value pixels for each of the first and second images 202 and 204. The value pixels may be selected based on the pixels in the first and second images 202 and 204 with the highest intensity gradient magnitudes. For example, the pixels from the first image 202 may be sorted based on the highest intensity gradient magnitudes. A first particular number of the pixels in the first image 202 with the highest intensity gradient magnitudes may be selected as first value pixels. The pixels from the second image 204 may be sorted based on the highest intensity gradient magnitudes. A second particular number of the pixels in the second image 204 with the highest intensity gradient magnitudes may be selected as second value pixels. The first and the second particular numbers may be the same or different. The first and second value pixels may correspond with pixels at edges in the first and second images, respectively. An image edge as used herein does not refer to a physical edge of an image. Rather, an image edge refers to a location in an image with a rapidly changing intensity level between pixels. For example, for an image with a bright line, the pixels at the bright line may be edge pixels.

The first and the second particular numbers of value pixels for each of the first and second images 202 and 204 may vary based on a number of pixels in the image. In some embodiments, for a 300×300 pixel image, the first and the second particular numbers of value pixels may include 5, 10, 15, 20, 25, 30, 50, 75, or 100 pixels.

A value region size for determining the value intensity vectors may be based on a number of value pixels and a number of pixels in the image. In some embodiments, the value region size may be smaller than the set region size. In some embodiments, the value region size may be the same as the random region size. In some embodiments, the value region size for the first value pixels may be the same or different than the value region size for the second value pixels.

Based on the value region size and the first value pixels, the value module 256 may determine multiple first value intensity vectors 264 for the first image 202 and provide the first value intensity vectors 264 to the third difference module 270. Based on the value region size and the second value pixels, the value module 256 may also determine multiple second value intensity vectors 265 for the second image 204 and provide the second value intensity vectors 265 to the third difference module 270. In these and other embodiments, the value module 256 may determine the first value intensity vectors 264 and the second value intensity vectors 265 in a manner analogous to the operation of the set module 252 as discussed above.

The third difference module 270 may be configured to compare the first set intensity vectors 260 and the second set intensity vectors 261. To compare the first set intensity vectors 260 and the second set intensity vectors 261, the third difference module 270 may determine a Euclidean distance between corresponding vectors of the first set intensity vectors 260 and the second set intensity vectors 261. For example, a first vector of the first set intensity vectors 260 and a second vector of the second set intensity vectors 261 that share a corresponding set pixel in the first and second images 202 and 204 may be compared. A mean of the Euclidean distances between the corresponding pairs of the first set intensity vectors 260 and the second set intensity vectors 261 may be output by the third difference module 270 as the set intensity difference 272.

The third difference module 270 may also be configured to compare the first random intensity vectors 262 and the second random intensity vectors 263. To compare the first random intensity vectors 262 and the second random intensity vectors 263, the third difference module 270 may determine a Euclidean distance between corresponding vectors of the first random intensity vectors 262 and the second random intensity vectors 263 based on the corresponding random pixels in the first and second images 202 and 204. A mean of the Euclidean distances between the corresponding pairs of the first random intensity vectors 262 and the second random intensity vectors 263 may be output by the third difference module 270 as the random intensity difference 274.

The third difference module 270 may also be configured to compare the first value intensity vectors 264 and the second value intensity vectors 265. To compare the first value intensity vectors 264 and the second value intensity vectors 265, the third difference module 270 may determine a Euclidean distance between corresponding vectors of the first value intensity vectors 264 and the second value intensity vectors 265. A first value intensity vector may correspond to a second value intensity vector when the first value intensity vector is a best match of the second value intensity vector as compared to the other second value intensity vectors. A mean of the Euclidean distances between the corresponding pairs of the first value intensity vectors 264 and the second value intensity vectors 265 may be output by the third difference module 270 as the value intensity difference 276.

In view of this disclosure, it will be appreciated that modifications, additions, or omissions may be made to the process 200C without departing from the scope of the present disclosure. For example, in some embodiments, the intensity vector module 250 may down sample the first and second images 202 and 204 to reduce a number of pixels of the first and second images 202 and 204. For example, the intensity vector module 250 may generate down sampled first and second images 202 and 204 that are 16×16, 20×20, 24×24, 32×32, or some other number of pixels. The intensity vector module 250 may also be configured to convert the first and second images 202 and 204 to grayscale images before determining intensity gradients for each of the pixels of the first and second images 202 and 204. Alternately or additionally, one or more of the set module 252, the random module 254, or the value module 256 may not be included in the intensity vector module 250.

Figure 2D:
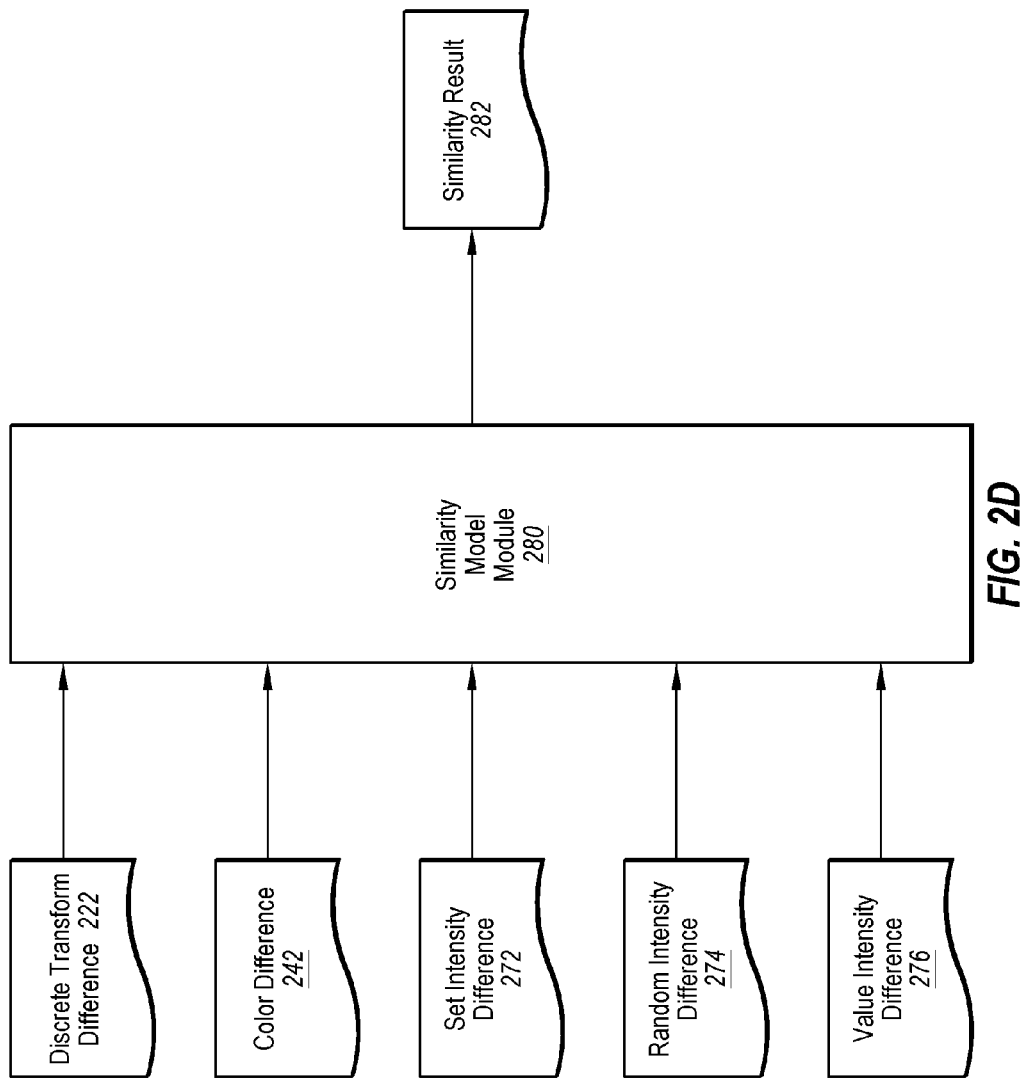
FIG. 2D illustrates a portion of an image similarity determination process.

FIG. 2D illustrates a portion of an image similarity determination process 200D. The process 200D may be arranged in accordance with at least one embodiment described herein. The process 200D may include a similarity model module 280. The similarity model module 280 may be configured to receive the discrete transform difference 222, the color difference 242, the intensity difference 272, the random intensity difference 274, and the value intensity difference 276. Based on the discrete transform difference 222, the color difference 242, the set intensity difference 272, the random intensity difference 274, and the value intensity difference 276, the similarity model module 280 may determine a similarity between the first and second images 202 and 204.

In some embodiments, the similarity model module 280 may include a similarity model that may receive the discrete transform difference 222, the color difference 242, the set intensity difference 272, the random intensity difference 274, and the value intensity difference 276 as inputs. In these and other embodiments, the similarity model may be a model generated using machine learning. In these and other embodiments, training values for the differences between images similar to those of the discrete transform difference 222, the color difference 242, the set intensity difference 272, the random intensity difference 274, and the value intensity difference 276 may be provided to train the similarity model to identify similar images based on the criteria of differences provided. Based on the training values, a creator of the similarity model may determine how the similarity model may determine similarities between images. In some embodiments, the machine learning technique used to generate the similarity model may be a technique that uses decision trees, such as a gradient boosting machine learning technique.

Generally, the similarity model module 280 may output an indication of the likelihood of similarity between the first and second images 202 and 204. When the likelihood of similarity is above a similarity threshold, a determination may be made that the first and second images 202 and 204 are similar. When the likelihood of similarity is below the similarity threshold, a determination may be made that the first and second images 202 and 204 are not similar. The similarity threshold may be selected based on a tolerance for error in determining similarities between the first and second images 202 and 204. The tolerance for error may be based on a system that includes the first and second images 202 and 204 and goods pictured in the first and second images 202 and 204, among other criteria. In view of this disclosure, it will be appreciated that modifications, additions, or omissions may be made to the process 200D without departing from the scope of the present disclosure.

Figure 4:
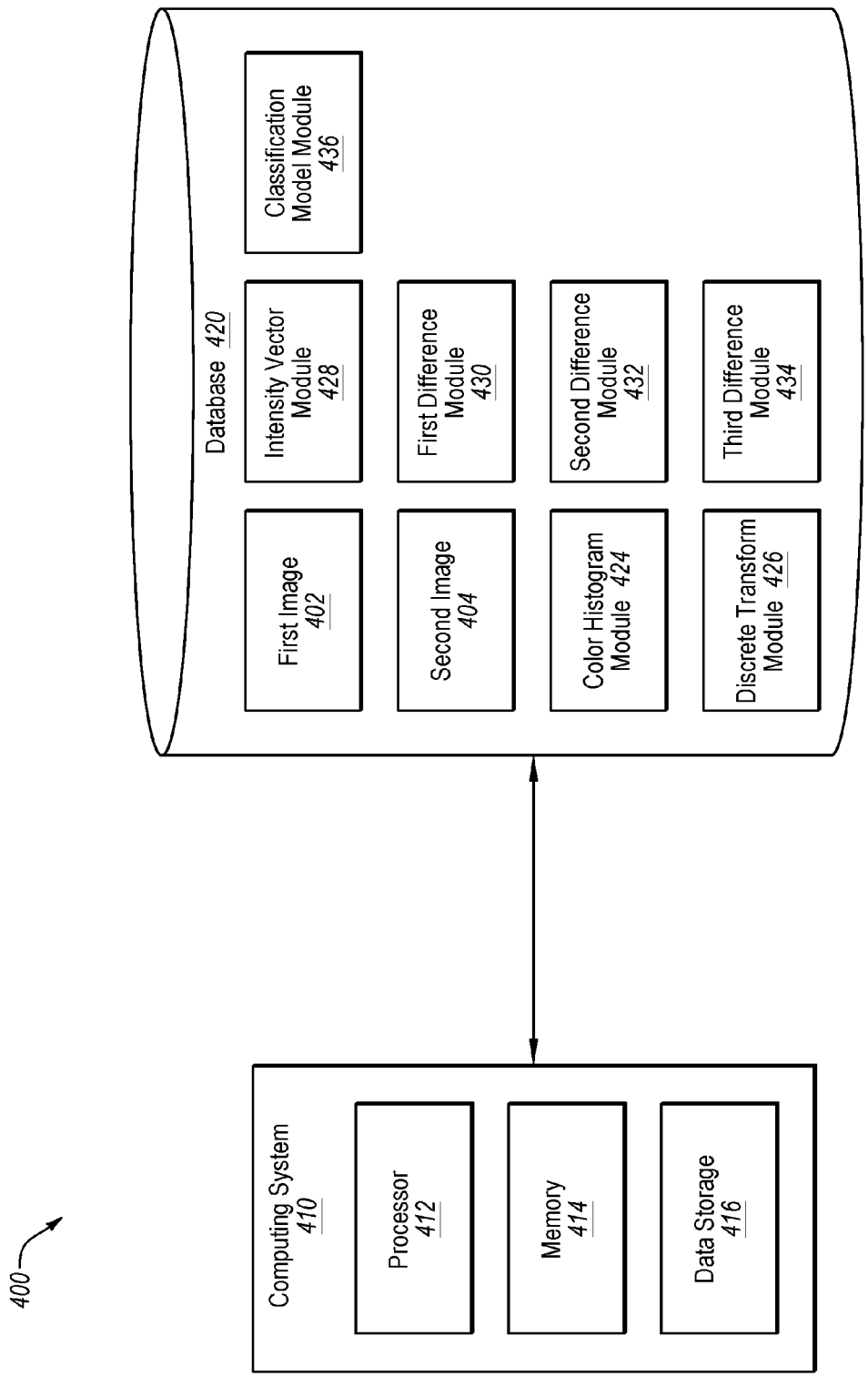
FIG. 4 illustrates an example system to determine image similarities.

FIG. 4 illustrates an example system 400 to determine image similarities. The system 400 may be arranged in accordance with at least one embodiment described herein. The system 400 may include a computing system 410 and a database 420. The computing system 410 may include a processor 412, a memory 414, and data storage 416. The processor 412, the memory 414, and the data storage 416 may be communicatively coupled.

In general, the processor 412 may include any suitable special-purpose or general-purpose computer, computing entity, or processing device including various computer hardware or software modules and may be configured to execute instructions stored on any applicable computer-readable storage media. For example, the processor 412 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, it is understood that the processor 412 may include any number of processors configured to perform individually or collectively any number of operations described herein. Additionally, one or more of the processors may be present on one or more different electronic devices, such as different servers. In some embodiments, the processor 412 may interpret and/or execute program instructions and/or process data stored in the memory 414, the data storage 416, or the memory 414 and the data storage 416. In some embodiments, the processor 412 may fetch program instructions from the data storage 416 and/or the database 420 and load the program instructions in the memory 414. After the program instructions are loaded into memory 414, the processor 412 may execute the program instructions.

The memory 414 and the data storage 416 may include computer-readable storage media for carrying or having computer-executable instructions or data structures stored thereon. Such computer-readable storage media may be any available media that may be accessed by a general-purpose or special-purpose computer, such as the processor 412. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 412 to perform a certain operation or group of operations.

The database 420 may be communicatively coupled with the computing system 410. The database 420 may include a first image 402 and a second image 404. The database 420 may also include multiple modules, that when executed by the processor 412, may cause the computing system 410 to perform operations that may determine a similarity between the first and second images 402 and 404.

The modules included in the database 420 may include a color histogram module 424, a discrete transform module 426, an intensity vector module 428, a first difference module 430, a second difference module 432, a third difference module 434, and a classification model module 436. The color histogram module 424, the discrete transform module 426, the intensity vector module 428, the first difference module 430, the second difference module 432, the third difference module 434, and the classification model module 436 may correspond to the color histogram module 230, the DT module 210, the intensity vector module 250, the first difference module 220, the second difference module 240, the third difference module 270, and the similarity model module 280, respectively, of FIGS. 2A, 2B, 2C, and 2D.

In some embodiments, the processor 412 may execute the color histogram module 424, the discrete transform module 426, and the intensity vector module 428 in parallel and at the same time. Alternately or additionally, the processor 412 may execute the color histogram module 424, the discrete transform module 426, and the intensity vector module 428 in serial or in some combination of parallel and serial executions.

In some embodiments, the processor 412 may execute the first difference module 430, the second difference module 432, and the third difference module 434 in parallel, serially, or in some combination of parallel and serial execution. In some embodiments, the processor 412 may execute the first difference module 430, the second difference module 432, and the third difference module 434 based on when the color histogram module 424, the discrete transform module 426, and the intensity vector module 428 finish execution.

In some embodiments, the processor 412 may execute the classification model module 436 after execution of the color histogram module 424, the discrete transform module 426, the intensity vector module 428, the first difference module 430, the second difference module 432, and the third difference module 434 and based on the outputs of the first difference module 430, the second difference module 432, the third difference module 434.

In view of this disclosure, it will be appreciated that modifications, additions, or omissions may be made to the system 400 without departing from the scope of the present disclosure. For example, the computing system 410 and the database 420 may be communicatively coupled by a network, such as the network 110 of FIG. 1. Alternately or additionally, the system 400 may include multiple computing systems 410 that may operate to execute one or more of the modules stored in the database 420.

Figure 5:
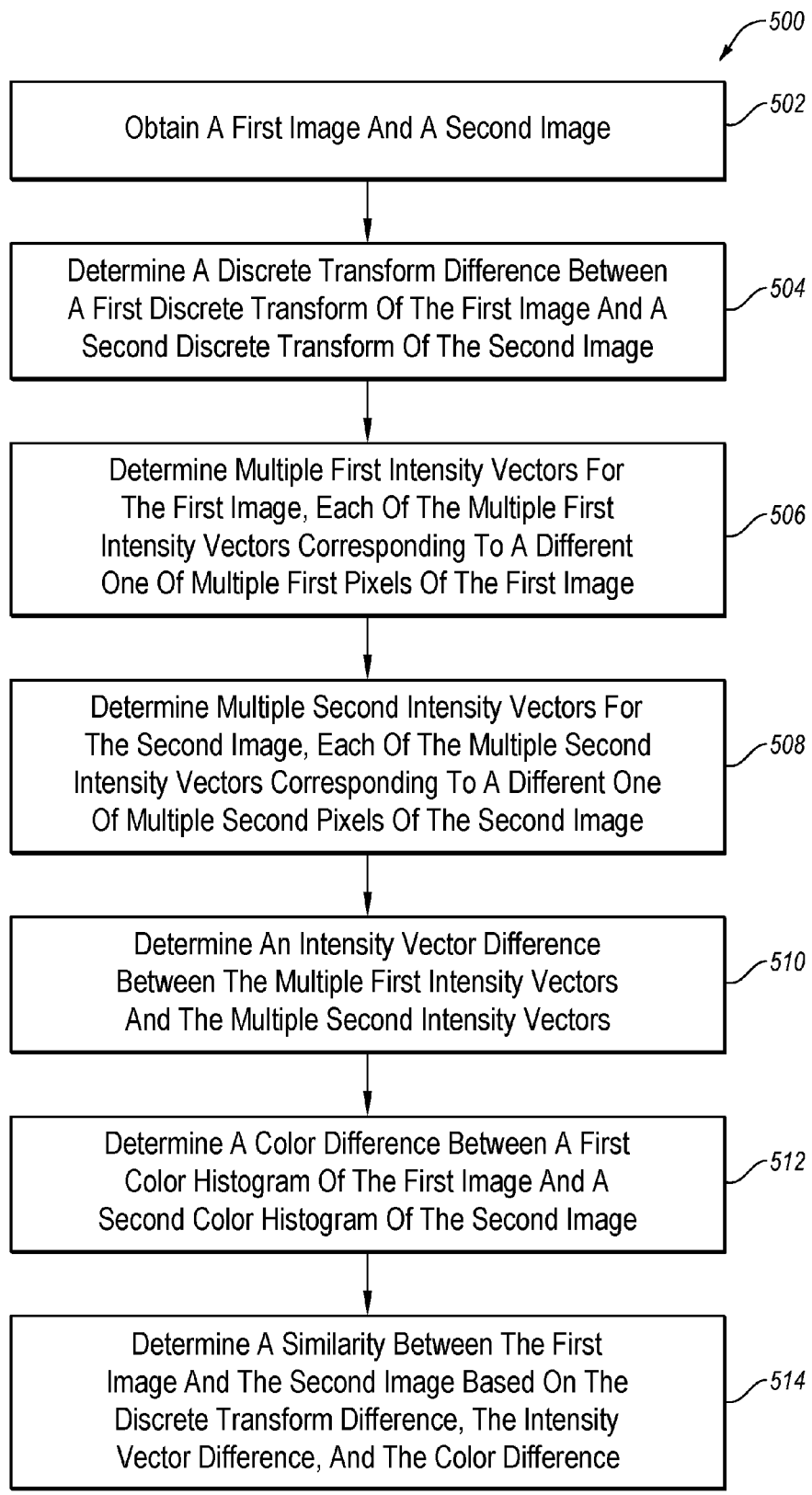
FIG. 5 is a flowchart of an example method to determine image similarities.

FIG. 5 is a flowchart of an example method 500 to determine image similarities. The method 500 may be arranged in accordance with at least one embodiment described herein. The method 500 may be implemented, in some embodiments, by a system, such as the system 100 and/or 400 of FIGS. 1 and 4, respectively. Although illustrated as discrete blocks, various blocks may be divided into additional blocks, combined into fewer blocks, or eliminated, depending on the desired implementation.

The method 500 may begin at block 502, where a first image and a second image may be obtained.

In block 504, a discrete transform difference may be determined between a first discrete transform of the first image and a second discrete transform of the second image.

In block 506, multiple first intensity vectors may be determined for the first image. Each of the multiple first intensity vectors may correspond to a different one of multiple first pixels of the first image.

In block 508, multiple second intensity vectors may be determined for the second image. Each of the multiple second intensity vectors may correspond to a different one of a multiple second pixels of the second image.

In block 510, an intensity vector difference may be determined between the multiple first intensity vectors and the multiple second intensity vectors. In some embodiments, determining the intensity vector difference between the multiple first intensity vectors and the multiple second intensity vectors may include determining a preliminary intensity vector difference between corresponding vectors of the multiple first intensity vectors and the multiple second intensity vectors and averaging the preliminary intensity vector differences.

In block 512, a color difference may be determined between a first color histogram of the first image and a second color histogram of the second image.

In block 514, a similarity between the first image and the second image may be determined based on the discrete transform difference, the intensity vector difference, and the color difference. In some embodiments, the first image may be determined to be similar to the second image when the second image is a duplicate of the first image and when the second image is a duplicate of the first image with a processing manipulation that results in a change to the first image that is not perceived by a human eye.

In some embodiments, determining the similarity between the first image and the second image based on the discrete transform difference, the intensity vector difference, and the color difference may include providing the discrete transform difference, the intensity vector difference, and the color difference to a similarity model generated using machine learning.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, in some embodiments, the first intensity vectors may be first first-type intensity vectors, the second intensity vectors may be second first-type intensity vectors, the multiple first pixels may be multiple first first-type pixels, and the multiple second pixels may be multiple second first-type pixels. In these and other embodiments, the method 500 may further include determining multiple first second-type intensity vectors for the first image. Each of the multiple first second-type intensity vectors may correspond to a different one of multiple first second-type pixels of the first image. The method 500 may further include determining multiple second second-type intensity vectors for the second image. Each of the multiple second second-type intensity vectors may correspond to a different one of multiple second second-type pixels of the second image. The method 500 may further include determining a second intensity vector difference between the multiple first second-type intensity vectors and the multiple second second-type intensity vectors. In these and other embodiments, determining the similarity between the first image and the second image may be based on the discrete transform difference, the intensity vector difference, the second intensity vector difference, and the color difference.

In these and other embodiments, the method 500 may further include determining multiple first third-type intensity vectors for the first image. Each of the multiple first third-type intensity vectors may correspond to a different one of multiple first third-type pixels of the first image. The method 500 may further include determining multiple second third-type intensity vectors for the second image. Each of the multiple second third-type intensity vectors may correspond to a different one of multiple second third-type pixels of the second image. The method 500 may further include determining a third intensity vector difference between the multiple first third-type intensity vectors and multiple second third-type intensity vectors. In these and other embodiments, determining the similarity between the first image and the second image may be based on the discrete transform difference, the intensity vector difference, the second intensity vector difference, the third intensity vector difference, and the color difference.

Figure 6A:
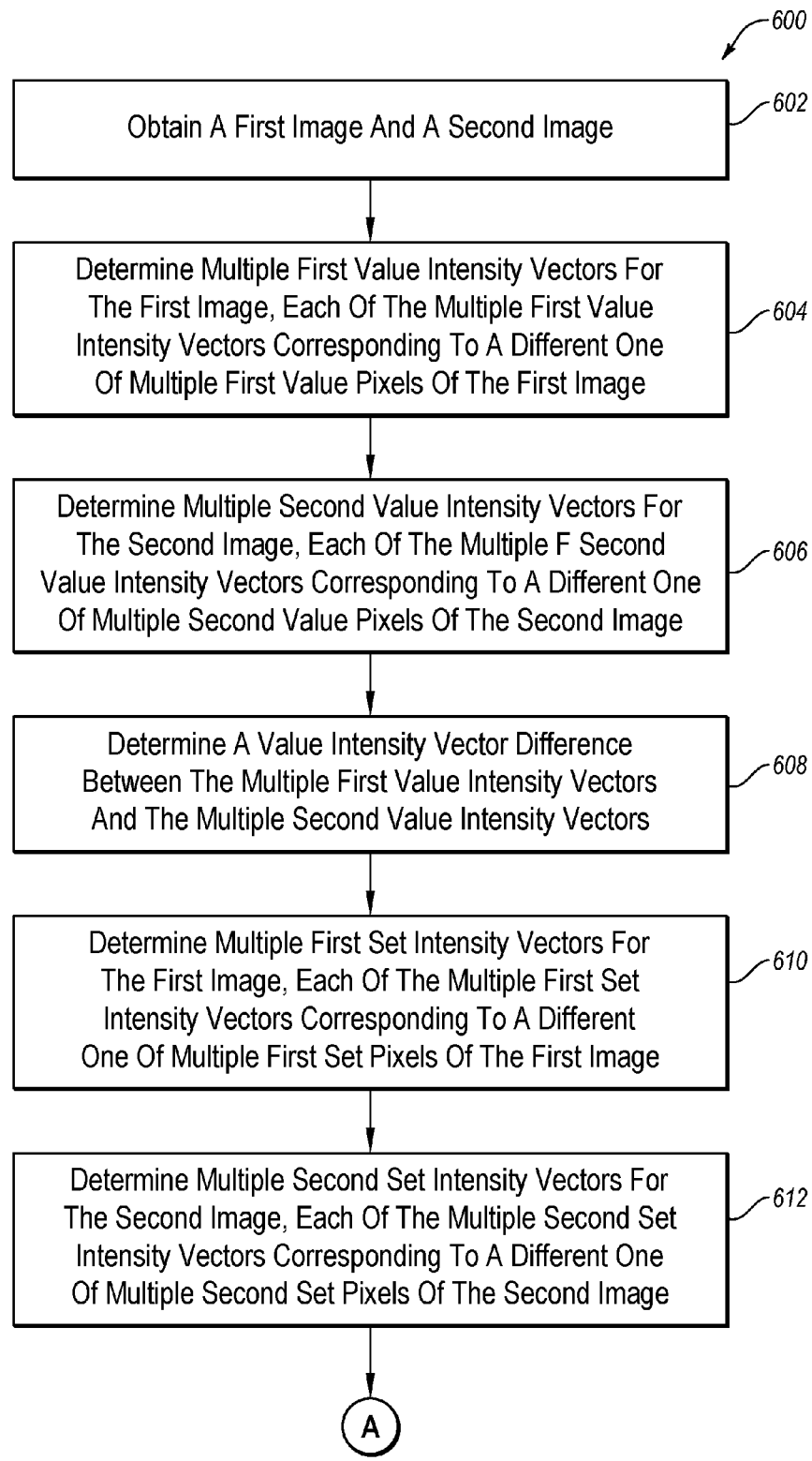
FIGS. 6A and 6B illustrate a flowchart of another example method to determine image similarities.
Figure 6B:
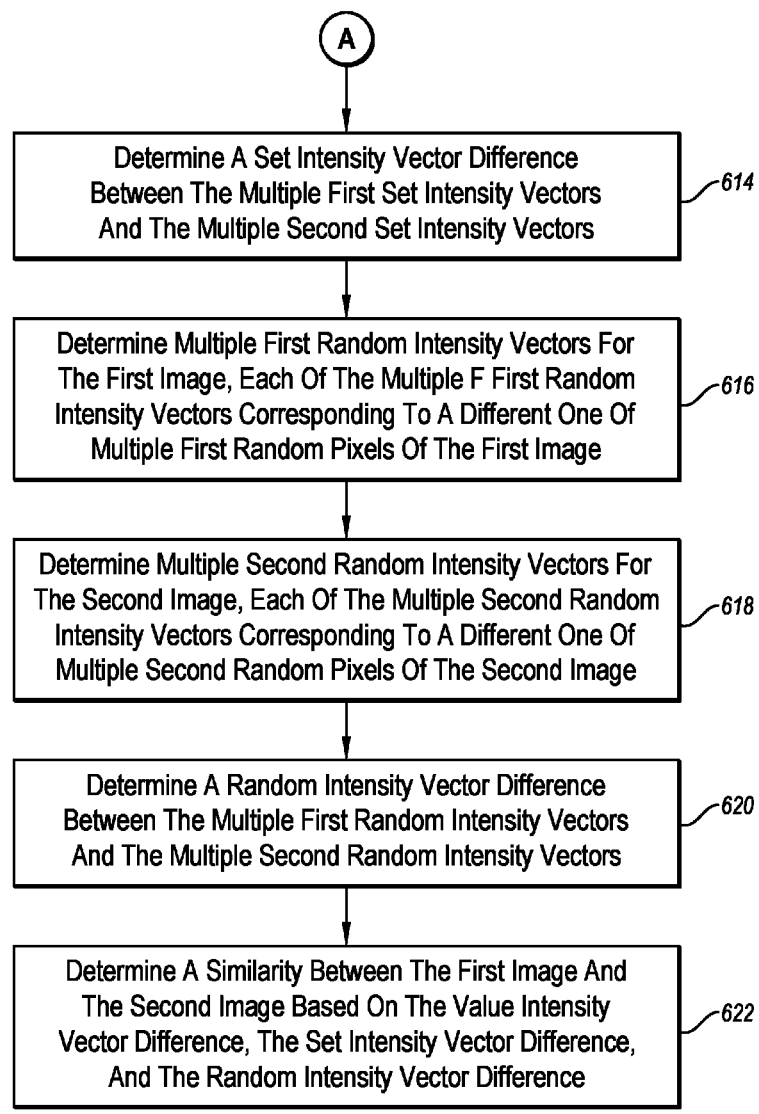

FIGS. 6A and 6B is a flowchart of an example method 600 to determine image similarities. The method 600 may be arranged in accordance with at least one embodiment described herein. The method 600 may be implemented, in some embodiments, by a system, such as the system 100 and/or 400 of FIGS. 1 and 4, respectively. Although illustrated as discrete blocks, various blocks may be divided into additional blocks, combined into fewer blocks, or eliminated, depending on the desired implementation.

The method 600 may begin at block 602, where a first image and a second image may be obtained.

In block 604, multiple first value intensity vectors may be determined for the first image. Each of the multiple first value intensity vectors may correspond to a different one of multiple first value pixels of the first image.

In block 606, multiple second value intensity vectors may be determined for the second image. Each of the multiple second value intensity vectors may correspond to a different one of multiple second value pixels of the second image. In some embodiments, the multiple first value pixels of the first image may be selected based on illumination intensity maximums in the first image. Alternately or additionally, the multiple second value pixels of the second image may be selected based on illumination intensity maximums in the second image.

In block 608, a value intensity vector difference may be determined between the multiple first value intensity vectors and the multiple second value intensity vectors.

In block 610, multiple first set intensity vectors may be determined for the first image. Each of the multiple first set intensity vectors may correspond to a different one of multiple first set pixels of the first image. In some embodiments, determining the multiple first set intensity vectors for one of multiple first set intensity vectors may include combining illumination intensities of multiple set region pixels that surround a set pixel of the multiple first set pixels that corresponds with the one of the first set intensity vectors.

In block 612, multiple second set intensity vectors may be determined for the second image. Each of the multiple second set intensity vectors may correspond to a different one of multiple second set pixels of the second image.

In some embodiments, the multiple first set pixels of the first image and the multiple second set pixels of the second image may be corresponding pixels in the first image and the second image that are based on a particular grid of pixels. In these and other embodiments, the particular grid of pixels may be an equal spaced grid of pixels distributed through the first and second images.

In block 614, a set intensity vector difference may be determined between the multiple first set intensity vectors and the multiple second set intensity vectors.

In block 616, multiple first random intensity vectors may be determined for the first image. Each of the multiple first random intensity vectors may correspond to a different one of multiple first random pixels of the first image. In some embodiments, determining the multiple first random intensity vectors for one of the multiple first random intensity vectors may include combining illumination intensities of multiple random region pixels that surround a random pixel of the multiple random pixels that corresponds with the one of the first random intensity vectors. In some embodiments, the multiple set region pixels may include more pixels than the multiple random region pixels.

In block 618, multiple second random intensity vectors may be determined for the second image. Each of the multiple second random intensity vectors may correspond to a different one of multiple second random pixels of the second image.

In some embodiments, the multiple first random pixels of the first image and the multiple second random pixels of the second image may be corresponding pixels in the first image and the second image that are selected randomly. In these and other embodiments, the multiple first random pixels and the multiple second random pixels may be selected randomly with at least a minimum distance there between.

In block 620, a random intensity vector difference may be determined between the multiple first random intensity vectors and the multiple second random intensity vectors.

In block 622, a similarity between the first image and the second image may be determined based on the value intensity vector difference, the set intensity vector difference, and the random intensity vector difference.

In some embodiments, the method 600 may further include determining a discrete transform difference between a first discrete transform of the first image and a second discrete transform of the second image. The method 600 may also include determining a color difference between a first color histogram of the first image and a second color histogram of the second image. In these and other embodiments, determining the similarity between the first image and the second image may be based on the discrete transform difference, the value vector difference, the set intensity vector difference, the random intensity vector difference, and the color difference.

As indicated above, the embodiments described herein may include the use of a special purpose or general purpose computer (e.g., the processor 412 of FIG. 4) including various computer hardware or software modules, as discussed in greater detail below. Further, as indicated above, embodiments described herein may be implemented using computer-readable media (e.g., the memory 414 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method, comprising:
    obtaining a first image from a database, the first image associated with a first database entry;
    obtaining a second image from a database, the second image associated with a second database entry;
    determining, using a computing system, a similarity between the first image and the second image; and
    in response to determining that the first image is similar to the second image, altering the second database entry in the database, altering the second database entry in the database includes one or more of: removing the second image from the database, altering the second image, and changing a status in the second database entry regarding placement of information from the second database entry in results from a search request,
    wherein determining the similarity between the first image and the second image includes:
        determining a plurality of first set intensity vectors for the first image, each of the plurality of first set intensity vectors corresponding to a different one of a plurality of first set pixels of the first image;
        determining a plurality of second set intensity vectors for the second image, each of the plurality of second set intensity vectors corresponding to a different one of a plurality of second set pixels of the second image, the plurality of the second set pixels corresponding to the plurality of the first set pixels;
        determining a plurality of first random intensity vectors for the first image, each of the plurality of first random intensity vectors corresponding to a different one of a plurality of first random pixels of the first image that are selected randomly in the first image;
        determining a plurality of second random intensity vectors for the second image, each of the plurality of second random intensity vectors corresponding to a different one of a plurality of second random pixels of the second image, the plurality of second random pixels selected based on and corresponding to the plurality of first random pixels;
        determining a set intensity vector difference between only the plurality of first set intensity vectors and the plurality of second set intensity vectors; and
        determining a random intensity vector difference between only the plurality of first random intensity vectors and the plurality of second random intensity vectors,
    wherein the similarity between the first image and the second image is determined based on the set intensity vector difference and the random intensity vector difference.

2. The computer-implemented method of claim 1, wherein the first image is determined to be similar to the second image when the second image is a duplicate of the first image and when the second image is a duplicate of the first image with a digital processing manipulation that results in a change to the second image that is not perceived by a human eye.

3. The computer-implemented method of claim 1, wherein the similarity between the first image and the second image is determined when the first and second images are selected for presentation in results from a search of entries in the database or in response to both the first image and second image being stored in the database.

4. The computer-implemented method of claim 1, wherein the similarity between the first image and the second image is determined in response to the first image and second image being obtained by the database from a same user.

5. The computer-implemented method of claim 1, wherein determining the similarity between the first image and the second image further includes:

determining a plurality of first value intensity vectors for the first image, each of the plurality of first value intensity vectors corresponding to a different one of a plurality of first value pixels of the first image;

determining a plurality of second value intensity vectors for the second image, each of the plurality of second value intensity vectors corresponding to a different one of a plurality of second value pixels of the second image; and determining a value intensity vector difference between the plurality of first value intensity vectors and the plurality of second value intensity vectors, wherein the similarity between the first image and the second image is determined based on the set intensity vector difference, the value intensity vector difference, and the random intensity vector difference.

6. The computer-implemented method of claim 5, wherein determining the similarity between the first image and the second image further includes:

applying a discrete transform to the first image to generate a first transform matrix that is a frequency representation of the first image;

applying the discrete transform to the second image to generate a second transform matrix that is a frequency representation of the second image; and determining a discrete transform difference between the first transform matrix of the first image and the second transform matrix of the second image, wherein the similarity between the first image and the second image is determined based on the set intensity vector difference, the value intensity vector difference, the discrete transform difference, and the random intensity vector difference.

7. The computer-implemented method of claim 6, wherein determining the similarity between the first image and the second image further includes:

generate first color information of the first image based on one or more first color histograms of hue and saturation of the first image;

generate second color information of the second image based on one or more second color histograms of hue and saturation of the second image; and determining a color difference between the first image and the second image using the first color information and the second color information, wherein the similarity between the first image and the second image is determined based on the set intensity vector difference, the value intensity vector difference, the color difference, the discrete transform difference, and the random intensity vector difference.

8. One or more non-transitory computer-readable media having instructions stored thereon that, responsive to execution by one or more computing systems, cause the one or more computing systems to perform the computer-implemented method of claim 1.

9. A computer-implemented method, comprising:

obtaining a first image from a database, the first image associated with a first database entry;

obtaining a second image from a database, the second image associated with a second database entry;

determining, using a computing system, a similarity between the first image and the second image; and in response to determining that the first image is similar to the second image, altering the second database entry in the database, altering the second database entry in the database includes one or more of: removing the second image from the database, altering the second image, and changing a status in the second database entry regarding placement of information from the second database entry in results from a search request, wherein determining the similarity between the first image and the second image includes:

applying a discrete transform to the first image to generate a first transform matrix that is a frequency representation of the first image;

applying the discrete transform to the second image to generate a second transform matrix that is a frequency representation of the second image;

determining a plurality of first random intensity vectors for the first image, each of the plurality of first random intensity vectors corresponding to a different one of a plurality of first random pixels of the first image that are selected randomly in the first image; and determining a plurality of second random intensity vectors for the second image, each of the plurality of second random intensity vectors corresponding to a different one of a plurality of second random pixels of the second image, the plurality of second random pixels selected based on and corresponding to the plurality of first random pixels, wherein the similarity between the first image and the second image is determined based on the first transform matrix, the second transform matrix, the plurality of first random intensity vectors, and the plurality of second random intensity vectors.

10. The computer-implemented method of claim 9, wherein determining the similarity between the first image and the second image further includes:

determining a plurality of first set intensity vectors for the first image, each of the plurality of first set intensity vectors corresponding to a different one of a plurality of first set pixels of the first image, the plurality of first set pixels selected based on a geometric shape;

determining a plurality of second set intensity vectors for the second image, each of the plurality of second set intensity vectors corresponding to a different one of a plurality of second set pixels of the second image, the plurality of the second set pixels selected based on and corresponding to the plurality of the first set pixels; and determining a set intensity vector difference between the plurality of first set intensity vectors and the plurality of second set intensity vectors, wherein the similarity between the first image and the second image is further determined based on the set intensity vector difference.

11. The computer-implemented method of claim 10, wherein determining the similarity between the first image and the second image further includes:

determining a plurality of first value intensity vectors for the first image, each of the plurality of first value intensity vectors corresponding to a different one of a plurality of first value pixels of the first image, each of the plurality of first value pixels including intensity gradient magnitudes higher than intensity gradient magnitudes of pixels of the first image that are not part of the plurality of first value pixels and the intensity gradient magnitudes of each of the plurality of first value pixels determined based on an intensity value of the each of the plurality of first value pixels and one or more pixels adjacent to the each of the plurality of first value pixels;

determining a plurality of second value intensity vectors for the second image, each of the plurality of second value intensity vectors corresponding to a different one of a plurality of second value pixels of the second image, each of the plurality of second value pixels including intensity gradient magnitudes higher than intensity gradient magnitudes of pixels of the second image that are not part of the plurality of second value pixels and the intensity gradient magnitudes of each of the plurality of second value pixels determined based on an intensity value of the each of the plurality of second value pixels and one or more pixels adjacent to the each of the plurality of second value pixels; and determining a value intensity vector difference between the plurality of first value intensity vectors and the plurality of second value intensity vectors, wherein the similarity between the first image and the second image is further determined based on the value intensity vector difference, and the set intensity vector difference.

12. The computer-implemented method of claim 11, wherein determining the similarity between the first image and the second image further includes:

generate first color information of the first image based on one or more first color histograms of hue and saturation of the first image;

generate second color information of the second image based on one or more second color histograms of hue and saturation of the second image; and determining a color difference between the first image and the second image using the first color information and the second color information, wherein the similarity between the first image and the second image is further determined based on the set intensity vector difference, the value intensity vector difference, and the color difference.

13. The computer-implemented method of claim 9, wherein determining the similarity between the first image and the second image further includes:

determining a random intensity vector difference between the plurality of first random intensity vectors and the plurality of second random intensity vectors; and determining a discrete transform difference between the first transform matrix of the first image and the second transform matrix of the second image, wherein the similarity between the first image and the second image is determined based on the discrete transform difference and the random intensity vector difference.

14. The computer-implemented method of claim 13, wherein determining the similarity between the first image and the second image further includes:

determining a plurality of first value intensity vectors for the first image, each of the plurality of first value intensity vectors corresponding to a different one of a plurality of first value pixels of the first image, each of the plurality of first value pixels including intensity gradient magnitudes higher than intensity gradient magnitudes of pixels of the first image that are not part of the plurality of first value pixels and the intensity gradient magnitudes of each of the plurality of first value pixels determined based on an intensity value of the each of the plurality of first value pixels and one or more pixels adjacent to the each of the plurality of first value pixels;

determining a plurality of second value intensity vectors for the second image, each of the plurality of second value intensity vectors corresponding to a different one of a plurality of second value pixels of the second image, each of the plurality of second value pixels including intensity gradient magnitudes higher than intensity gradient magnitudes of pixels of the second image that are not part of the plurality of second value pixels and the intensity gradient magnitudes of each of the plurality of second value pixels determined based on an intensity value of the each of the plurality of second value pixels and one or more pixels adjacent to the each of the plurality of second value pixels; and determining a value intensity vector difference between the plurality of first value intensity vectors and the plurality of second value intensity vectors, wherein the similarity between the first image and the second image is determined based on the random intensity vector difference, the value intensity vector difference, and the discrete transform difference.

15. The computer-implemented method of claim 9, wherein determining the similarity between the first image and the second image further includes:

determining a plurality of first value intensity vectors for the first image, each of the plurality of first value intensity vectors corresponding to a different one of a plurality of first value pixels of the first image, each of the plurality of first value pixels including intensity gradient magnitudes higher than intensity gradient magnitudes of pixels of the first image that are not part of the plurality of first value pixels and the intensity gradient magnitudes of each of the plurality of first value pixels determined based on an intensity value of the each of the plurality of first value pixels and one or more pixels adjacent to the each of the plurality of first value pixels;

determining a plurality of second value intensity vectors for the second image, each of the plurality of second value intensity vectors corresponding to a different one of a plurality of second value pixels of the second image, each of the plurality of second value pixels including intensity gradient magnitudes higher than intensity gradient magnitudes of pixels of the second image that are not part of the plurality of second value pixels and the intensity gradient magnitudes of each of the plurality of second value pixels determined based on an intensity value of the each of the plurality of second value pixels and one or more pixels adjacent to the each of the plurality of second value pixels; and determining a value intensity vector difference between the plurality of first value intensity vectors and the plurality of second value intensity vectors, wherein the similarity between the first image and the second image is further determined based on the value intensity vector difference.

16. One or more non-transitory computer-readable media having instructions stored thereon that, responsive to execution by one or more computing systems, cause the one or more computing systems to perform the computer-implemented method of claim 9.

17. The computer-implemented method of claim 9, wherein the first image is determined to be similar to the second image when the second image is a duplicate of the first image and when the second image is a duplicate of the first image with a digital processing manipulation that results in a change to the second image that is not perceived by a human eye.

18. The computer-implemented method of claim 9, wherein the similarity between the first image and the second image is determined when the first and second images are selected for presentation in results from a search of entries in the database or in response to both the first image and second image being stored in the database.

19. The computer-implemented method of claim 9, wherein the similarity between the first image and the second image is determined in response to the first image and second image being obtained by the database from a same user.

* * * * *